(12) United States Patent
Dunbar et al.

(10) Patent No.: US 9,759,737 B2
(45) Date of Patent: Sep. 12, 2017

(54) METHOD AND APPARATUS FOR MONITORING SPEED AND POSITION OF A ROTATING MEMBER

(71) Applicant: GM GLOBAL TECHNOLOGY OPERATIONS LLC, Detroit, MI (US)

(72) Inventors: Leah Dunbar, Brighton, MI (US); Yo Chan Son, Rochester Hills, MI (US); Martin E. Rosalik, Jr., Oakland, MI (US); Justin O. Nielsen, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 460 days.

(21) Appl. No.: 14/560,522

(22) Filed: Dec. 4, 2014

(65) Prior Publication Data

US 2016/0054351 A1 Feb. 25, 2016

Related U.S. Application Data

(60) Provisional application No. 62/040,540, filed on Aug. 22, 2014.

(51) Int. Cl.
*G01D 5/14* (2006.01)
*H03K 23/00* (2006.01)
(Continued)

(52) U.S. Cl.
CPC .......... *G01P 13/045* (2013.01); *G01D 5/2451* (2013.01); *G01P 3/487* (2013.01)

(58) Field of Classification Search
CPC G01R 35/00; G01R 13/02; G01R 31/318527; G01D 11/00; G01D 3/028;
(Continued)

(56) References Cited

U.S. PATENT DOCUMENTS 5,686,835 A * 11/1997 Watanabe .............. G01R 33/09
324/166
5,917,320 A * 6/1999 Scheller ................... G01D 3/02
324/166

(Continued)

FOREIGN PATENT DOCUMENTS

DE 19730806 A1 1/1999
DE 60116424 T2 9/2006

*Primary Examiner* — Son Le
(74) *Attorney, Agent, or Firm* — Quinn IP Law

(57) ABSTRACT

A first counter is incremented when a first rotational speed sensing device detects a falling edge of one of the teeth of a single multi-tooth target wheel, a second counter is incremented when a second rotational speed sensing device detects a falling edge of one of the teeth, and a third counter is incremented when either of the first and second rotational speed sensing devices detects either of a rising edge and a falling edge of one of the teeth. A direction of rotation is determined based upon the third counter and a rotational speed of the rotatable member is determined based upon one of the first and second counters. The rotatable member is indicated to be at zero speed when the rotational speed is less than a threshold speed and the direction of rotation changes between a positive direction and a negative direction.

15 Claims, 5 Drawing Sheets

(51) Int. Cl.
*G01P 13/04* (2006.01)
*G01D 5/245* (2006.01)
*G01P 3/487* (2006.01)

(58) Field of Classification Search
CPC ....... H03K 2005/00247; H03K 23/004; H03K 23/588; G11C 27/02; G11C 29/02; G11C 8/04
See application file for complete search history.

(56) References Cited

U.S. PATENT DOCUMENTS

2011/0025307 A1     2/2011  Koski et al.
2011/0048102 A1*    3/2011  Fernandez ........... G01D 5/2448
                                                73/1.79

* cited by examiner

METHOD AND APPARATUS FOR MONITORING SPEED AND POSITION OF A ROTATING MEMBER

CROSS-REFERENCE TO RELATED APPLICATIONS

This application claims the benefit of U.S. Provisional Patent Application No. 62/040,540 filed on Aug. 22, 2014, the disclosure of which is hereby incorporated by reference.

TECHNICAL FIELD

The present disclosure relates to rotational speed sensing systems and methods associated therewith.

BACKGROUND

The background description provided herein is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Vehicles are equipped with rotational speed sensors that monitor operation of rotating members for purposes of control and diagnostics. Monitored members may be integral elements of an internal combustion engine, a transmission, an electric motor/generator, wheels, and the like.

SUMMARY

A method for evaluating signal outputs from first and second rotational speed sensing devices monitoring a single multi-tooth target wheel rotationally coupled to a rotatable member includes monitoring, by a controller, signal outputs from the first and second rotational speed sensing devices. A first counter is incremented when the first rotational speed sensing device detects a falling edge of one of the teeth of the target wheel, a second counter is incremented when the second rotational speed sensing device detects a falling edge of one of the teeth of the target wheel, and a third counter is incremented when either of the first and second rotational speed sensing devices detects either of a rising edge and a falling edge of one of the teeth of the target wheel. A direction of rotation of the rotatable member is determined based upon the third counter and a rotational speed of the rotatable member is determined based upon one of the first and second counters. The rotatable member is indicated to be at a zero speed when the rotational speed is less than a threshold speed and the direction of rotation of the rotatable member changes between a positive direction and a negative direction.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
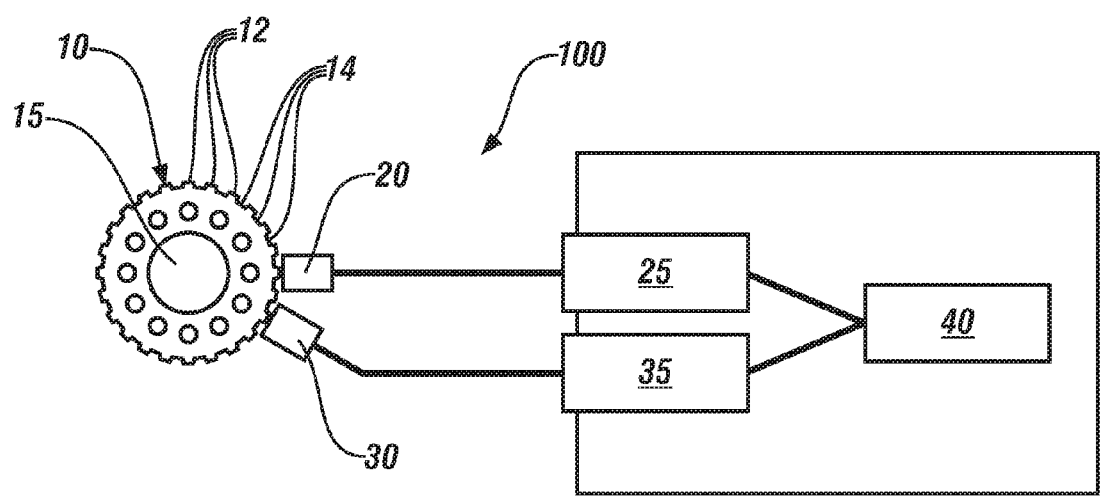
FIG. 1 schematically illustrates a functional block diagram of a directional speed sensing system for monitoring a rotatable member, in accordance with the disclosure.

Referring now to the drawings, wherein the depictions are for the purpose of illustrating certain exemplary embodiments only and not for the purpose of limiting the same, FIG. 1 schematically illustrates a functional block diagram of a directional speed sensing system 100 for monitoring a rotatable member 15. The directional speed sensing system 100 includes a multi-tooth target wheel 10 rotatably coupled to the rotatable member 15, a first sensing device 20 signally connected to a first controller 25 and a second sensing device 30 signally connected to a second controller 35. The first and second controllers 25, 35 signally connect to a monitoring controller 40. As used herein, the term controller refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The first and second sensing devices 20, 30 are Hall-effect sensors in one embodiment, each including a magnet source that generates magnetic flux when interacting with individual teeth 12 of the multi-tooth target wheel 10. Hall-effect sensors include a transducer that varies signal output in response to a change in magnetic field that can be caused by passage of teeth 12 and interspersed gaps 14 on the rotating target wheel 10 attached to the rotatable member 15. The multi-tooth target wheel 10 attaches to and rotates with the rotatable member 15. In one embodiment, the rotatable member 15 couples to a rotor of an electric motor/generator that is deployed on a multi-mode transmission to generate tractive torque in a vehicle, although the concepts described herein are not so limited. Alternatively, the rotatable member 15 may include a crankshaft, a driveshaft, a transmission input shaft, a transmission output shaft, or another suitable shaft of a vehicle. The multi-tooth target wheel 10 may include a quantity of N teeth 12 where N is an integer greater than one. The N teeth 12 are preferably spaced equally around an outer periphery of the multi-tooth target wheel 10 and separated by interspersed gaps 14. In one embodiment, and as shown, angular rotation of the multi-tooth target wheel 10 associated with a complete one of the teeth 12 is equivalent to angular rotation of the multi-tooth target wheel 10 associated with one of the gaps 14. In this manner, leading edges between two successive ones of the N teeth 12 may be separated by an angular rotation of 360°/N of the rotatable member 15. In some implementations, the multi-tooth target wheel 10 may include a tooth gap (not shown) wherein one or more of the teeth 12 is missing. The tooth gap may indicate a reference rotational position for the rotatable member 15, such as a top-dead-center position of cylinder number 1 when the rotatable member 15 couples to an internal combustion engine. Each of the teeth 12 of the wheel 10 may include a ferrous material that alters (e.g., concentrates) the magnetic flux.

Each of the first and second sensing devices 20, 30 generates a current pulse when its magnetic flux is changed by the passing of a leading edge or a falling edge of one of the teeth 12 and the contiguous gap 14 of the multi-tooth target wheel 10 during rotation. In this manner, a current pulse is generated each time one of the teeth 12 of the multi-tooth target wheel 10 passes one of the first and second sensing devices 20, 30. The first and second controllers 25, 35 each includes signal processing elements for capturing and evaluating signal changes and an accompanying time-stamp from the respective first and second sensing devices 20, 30 caused by changes in magnetic flux associated with rotation of the multi-tooth target wheel 10, including, by way of example an amplifier, an analog-to-digital converter, and/or other suitable components (not shown). The first and second sensing devices 20, 30 are physically arranged with an angular offset from each other with respect to an axis of rotation and corresponding center of the associated rotatable member 15 such that monitoring by the second sensing device 30 is offset by 90° of a single tooth cycle in relation to monitoring by the first sensing device 20 when a tooth cycle is defined as having 360° of rotation from a leading edge of a first of the teeth 12 to a leading edge of a second, successive one of the teeth 12. The first and second sensing devices 20, 30 are employed to detect position, speed and rotational direction of the rotatable member 15.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event with an associated time-stamp. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like.

A vehicle employing a hybrid powertrain system that includes an electric motor/generator may employ one or multiple sensors, used as an encoder, to monitor rotation speed and position of its rotatable member 15. Under some operating conditions, the rotatable member 15 rotation may be stopped, such as when a brake clutch is locked. However, in-line mechanical vibration due to gear lash and other conditions may unpredictably oscillate the rotatable member 15 and sensor wheel, causing unexpected transitions in a signal output from a Hall-effect sensor. Such transitions in the signal output from the sensor can be interpreted as indicating rotational speed, which may lead to action by system control and diagnostic systems that is unnecessary and potentially disruptive to system operation.

Figure 2:
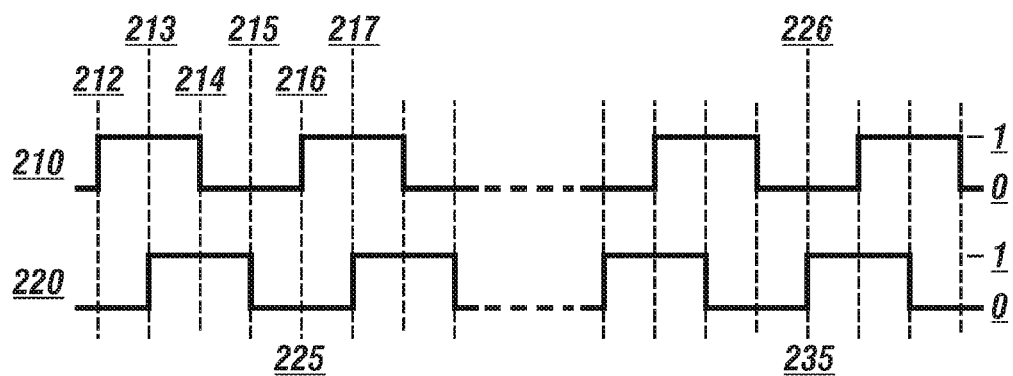
FIG. 2 graphically shows signal outputs from first and second sensing devices of an embodiment of the directional speed sensing system described with reference to FIG. 1, for monitoring rotation of the rotatable member in relation to time under steady-state, steady-speed operating conditions, in accordance with the disclosure.

FIG. 2 graphically shows signals A 210 and B 220 that are output from first and second sensing devices 20, 30, respectively, of an embodiment of the directional speed sensing system 100 described with reference to FIG. 1, for monitoring rotation of rotatable member 15 in relation to time, which is shown horizontally. Signal A 210 is a discrete signal having a value of high ("1") or low ("0") associated with the first sensing device 20 and signal B 220 is a discrete signal having a value of 1 or 0 associated with the second sensing device 30. Signal A 210 includes a plurality of tooth cycles associated with rotation of the rotatable member 15, including one tooth cycle beginning at a rising edge at timepoint 212 including a falling edge at timepoint 214, and ending at an immediately subsequent rising edge at timepoint 216. Signal B 220 includes a plurality of tooth cycles associated with the rotation of the rotatable member 15, including one tooth cycle beginning at a rising edge at timepoint 213, including a falling edge at timepoint 215, and ending at an immediately subsequent rising edge at timepoint 217. Each tooth cycle can be described in terms of 360° of tooth rotation with the signal B 220 shifted by 90° of tooth rotation from the signal A 210, as described herein.

The signal outputs including signal A 210 and signal B 220 indicate the rotational direction of the rotatable member 15 as follows. Period 225 indicates a nominally forward direction of rotation, which includes signal A 210 in a high state (1) when signal B 220 transitions from 0 to 1 at timepoints 213 and 217, i.e., signal A leads signal B. Period 235 indicates a nominally reverse direction of rotation, which includes signal A 210 in a low state (0) when signal B 220 transitions from 0 to 1 at timepoint 226, i.e., signal B leads signal A.

Figure 3:
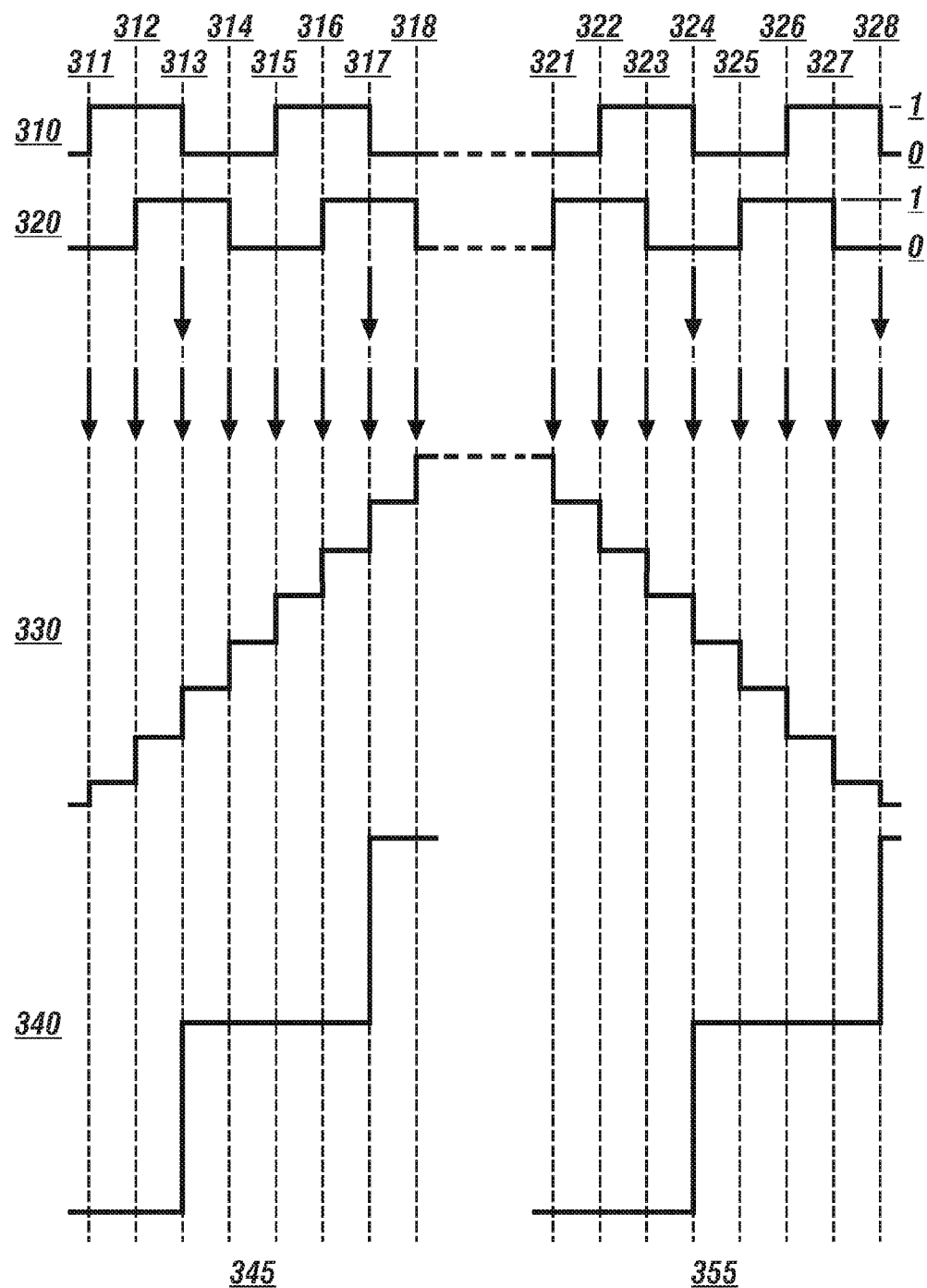
FIG. 3 graphically shows signal outputs from first and second sensing devices of an embodiment of the directional speed sensing system described with reference to FIG. 1 and corresponding counters including a 4× counter and a 1×a counter in relation to time, in accordance with the disclosure.

FIG. 3 graphically shows signals A 310 and B 320 that are output from an embodiment of the directional speed sensing system 100 described with reference to FIG. 1, including first and second sensing devices 20, 30, respectively, monitoring rotation of rotatable member 15 in relation to time, which is shown horizontally. Signals A 310 and B 320 are analogous to signals A 210 and B 220, respectively, which are shown with reference to FIG. 2. Other analogous signals include a 4× counter 330 and a 1×a counter 340. The signals A 310 and B 320, the 1×a counter 340 and the 4× counter 330 are employed to monitor rotational speed and direction of the rotatable member 15 as follows. The 4× counter 330 quantifies the number of rising and falling edges of both signals A 310 and B 320, and is bi-directional, counting up for a nominally forward direction of rotation and down for a nominally reverse direction of rotation. Period 345 includes a nominally forward direction of rotation, and period 355 includes a nominally reverse direction of rotation. Thus, as shown, the 4× counter 330 increments at each of timepoints 311, 312, 313, 314, 315, 316, 317 and 318 associated with forward direction of rotation, and decrements at each of timepoints 321, 322, 323, 324, 325, 326, 327 and 328 associated with reverse direction of rotation. The 1×a counter 340 quantifies falling edges associated with signal A 310, and only counts upwardly. Thus, as shown, the 1×a counter 340 increments at each of timepoints 313 and 317 in the forward direction, and also increments at each of timepoints 324 and 328 in the reverse direction. A corresponding 1×b counter (not shown) quantifies falling edges associated with signal B 320. These counters only count up and wrap to zero when the maximum value is reached. Rotational speed is determined by monitoring a pulse count and a time count determined for each of the monitored sensor signals A 310 and B 320, with the pulse count similar to the 1×a counter 340 and the time count in the form of a time stamp for each of the falling edges. The speed is preferably calculated by dividing a pulse count delta by a time count delta and applying a scale factor. The 1×a counter 340 is also referred to herein as a first counter, the 1×b counter (not shown) is also referred to herein as a second counter and the 4× counter 330 is also referred to herein as a third counter.

Figure 4:
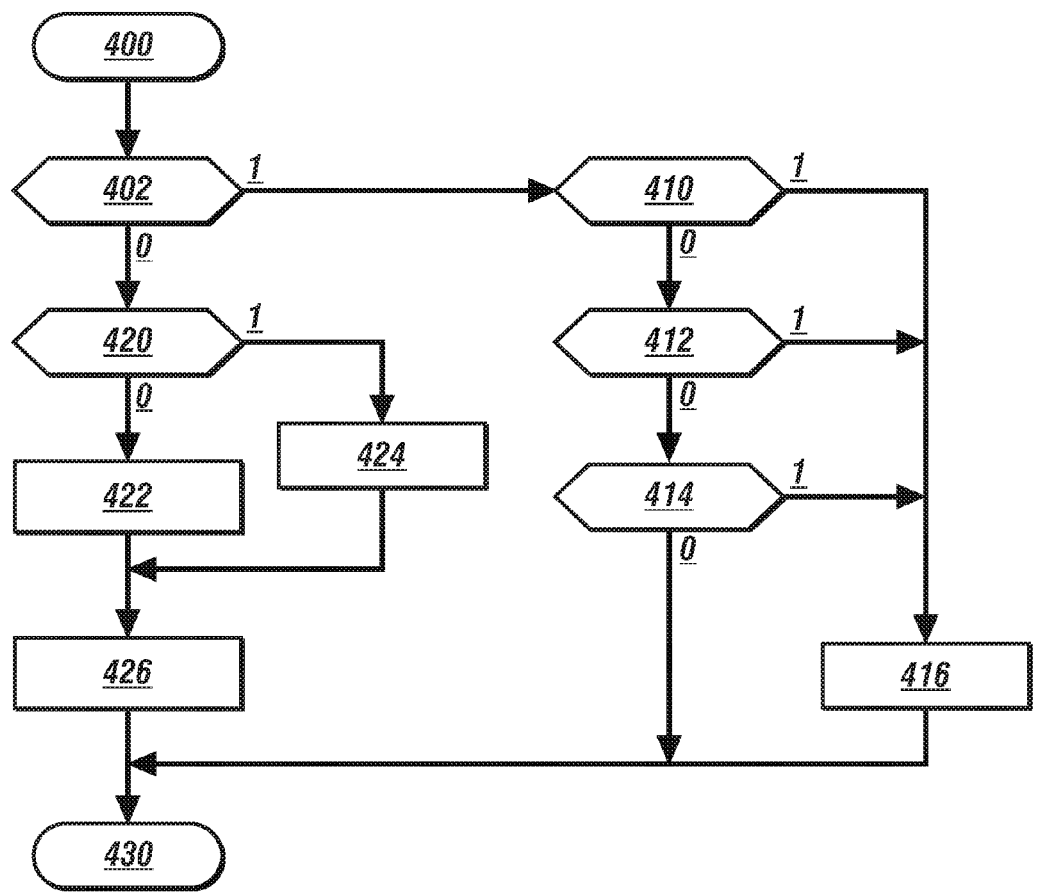
FIG. 4 schematically shows a speed determination routine, in accordance with the disclosure.

FIG. 4 schematically shows a speed determination routine 400 that is executed in a controller in an embodiment of the directional speed sensing system 100 described hereinabove. Table 1 is provided as a key wherein the numerically labeled blocks and the corresponding functions are set forth as follows, corresponding to the speed determination routine 400.

TABLE 1

| BLOCK | BLOCK CONTENTS |
| --- | --- |
| 400 | Speed determination routine |
| 402 | Is 1xa count delta = 0? |
| 410 | Zero speed hold period expired? |
| 412 | Nrpm < threshold AND Dir[k] = Dir[k − 1]? |
| 414 | Invalid duty cycle |
| 416 | Indicate zero speed |
| 420 | Nrpm< threshold AND Dir[k] = Dir[k − 1]? |
| 422 | Calculate speed |
| 424 | Indicate zero speed |
| 426 | Capture direction in Dir[k] |
| 430 | Exit |

The speed determination routine 400 monitors signals that are output from an embodiment of the directional speed sensing system 100 described with reference to FIG. 1 to check for occurrence of changes in rotational direction at low speeds. The speed determination routine 400 is a scheduled task that executes periodically during ongoing operation, e.g., once every 100 microseconds or once every 500 microseconds. Monitored signals illustrating the concepts related to the speed determination routine 400 are described with reference to FIG. 5, and include signals A 510 and B 520 and 4× counter 530. As previously described, a rotational speed Nrpm is calculated by dividing a pulse count delta by a time count delta and applying a scale factor. The rotational speed Nrpm is the most recently calculated value. A 1×a count delta is determined, and is a numerical count of falling edges of the 1×a counter since the previous periodic execution of the speed determination routine 400. When the 1×a count delta has a value of zero (402)(1), indicating no occurrence of falling edges since the previous execution, it is determined whether a zero speed hold period has expired, which can be in the order of magnitude of 300 ms (410). If the zero speed hold period has expired with the 1×a count delta remaining at zero (410)(1), the routine indicates the speed is zero (416) and this iteration ends (430).

If the zero speed hold period has not expired with the 1×a count delta remaining at zero (410)(0), the rotational speed Nrpm is compared to a threshold speed and the rotational direction for this iteration Dir[k] is compared to rotational direction for the previous iteration Dir[k−1] (412). When the rotational speed Nrpm is less than the threshold speed and the rotational direction for this iteration Dir[k] is opposite to the rotational direction for the previous iteration Dir[k−1] (412)(1), the routine indicates the speed is zero (416) and this iteration ends (430).

When the rotational speed Nrpm is not less than the threshold speed and/or the rotational direction for this iteration Dir[k] is the same as the rotational direction for the previous iteration Dir[k−1] (412)(0), the system determines whether the duty cycle of the counters is invalid (414). One embodiment of a duty cycle validation routine is described with reference to FIG. 6. When the duty cycle is invalid (414)(1), the routine indicates the speed to be zero (416) and this iteration ends (430).

When the 1×a count delta does not have a value of zero (402)(0), the rotational speed Nrpm is compared to a threshold speed and the rotational direction for this iteration Dir[k] is compared to rotational direction for the previous iteration Dir[k−1] (420). When the rotational speed Nrpm is less than the threshold speed and the rotational direction for this iteration Dir[k] is opposite to the rotational direction for the previous iteration Dir[k−1] (420)(1), the routine indicates the rotational speed is zero (424). The rotational direction Dir[k] is captured (426) and this iteration ends (430). When the rotational speed Nrpm is not less than the threshold speed and/or the rotational direction for this iteration Dir[k] is the same as the rotational direction for the previous iteration Dir[k−1] (420)(0), the rotational speed Nrpm is calculated (422), rotational direction Dir[k] is captured (426) and this iteration ends (430). The 4× count indicates the rotational direction of the rotatable member 15. If the 4× count delta (current count number minus the previous count number) is positive, the rotational direction of the rotatable member 15 is forward. Likewise, if the 4× count delta is negative, the rotational direction of the rotating member is reverse.

Figure 5:
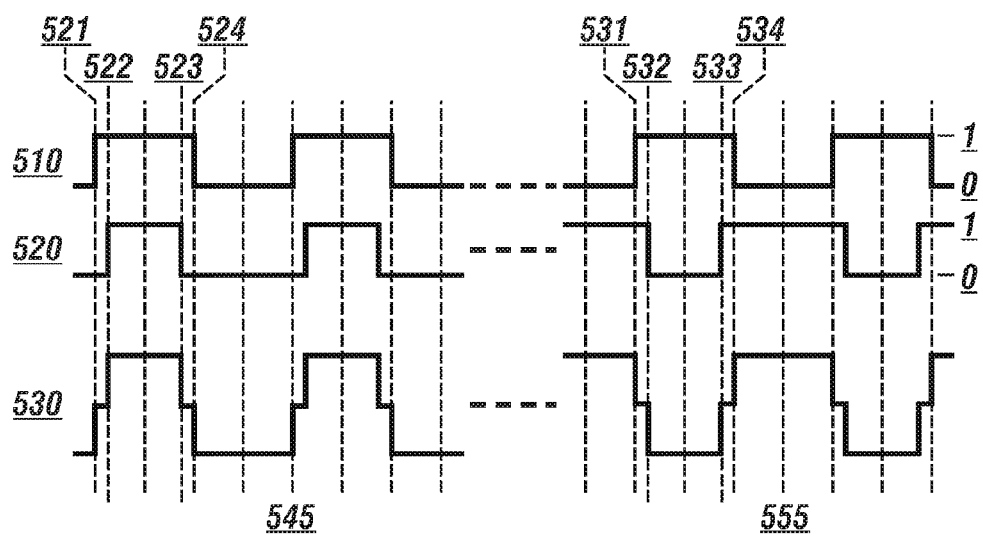
FIG. 5 graphically shows signal outputs from first and second sensing devices of an embodiment of the directional speed sensing system described with reference to FIG. 1 and a corresponding 4× counter under operating conditions when a zero speed condition is commanded, in accordance with the disclosure.

FIG. 5 graphically shows signals A 510, B 520 and 4× counter 530 that are output from an embodiment of the directional speed sensing system 100 described with reference to FIG. 1, including first and second sensing devices 20, 30, respectively, monitoring rotation of rotatable member 15 in relation to time, which is shown horizontally. Signals A 510, B 520 and 4× counter 530 are analogous to signals A 310, B 320, and 4× counter 330, respectively, which are shown with reference to FIG. 3. Period 545 and period 555 both show direction reversals. Signals A 510, B 520 and 4× counter 530 are captured under operating conditions that include a commanded zero speed condition with in-line vibration causing a back-and-forth rotation of the rotating member 15. Current pulses associated with rising or falling edges detected in either of signal A 510 or signal B 520 occur at timepoints 521, 522, 523 and 524 during period 545. In a similar manner, current pulses associated with rising or falling edges detected in either of signal A 510 or signal B 520 occur at timepoints 531, 532, 533 and 534 during period 555. The characteristics of the waveforms with vibrations are showed with in-phase switching or 180° out-of-phase switching, with slightly more than or slightly less than 50% duty cycles for one or both the waveforms.

When an embodiment of the speed determination routine 400 described with reference to FIG. 4 is employed, the waveform configurations can be interpreted as direction changes, with the 4× counter 530 incrementing and decrementing repeatedly, as shown by the 4× counter 530. This direction change can be employed when calculating the speed of the rotatable member 15. Below a low speed threshold where direction changes are considered valid, the direction is checked against the direction of the previous execution cycle. If a direction change has occurred, the rotatable member 15 is at zero speed. This logic prevents potentially incorrect speed calculations when the rotatable member 15 is commanded or locked at zero speed.

Figure 6:
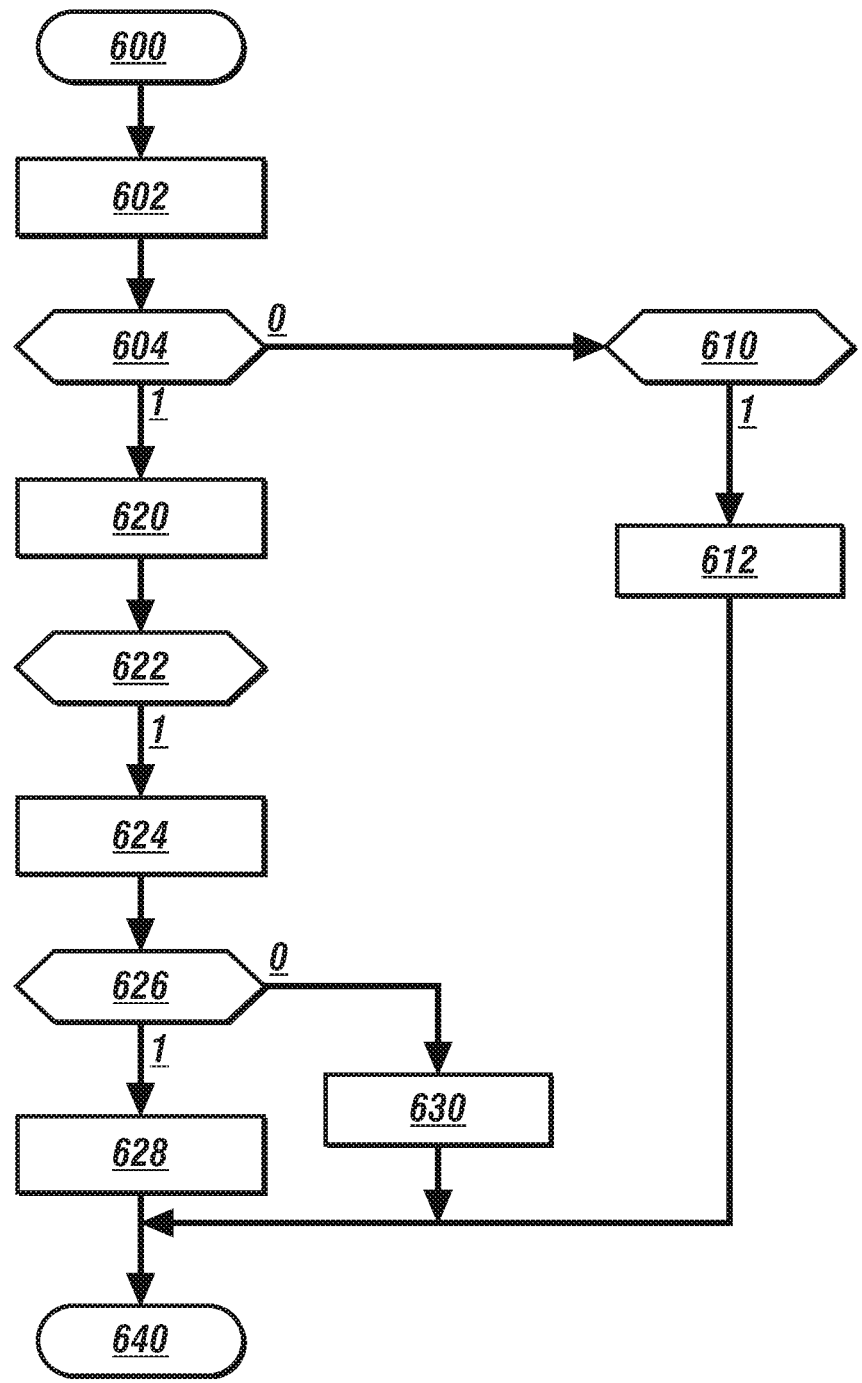
FIG. 6 schematically shows a duty cycle validation routine, in accordance with the disclosure.

FIG. 6 schematically shows a duty cycle validation routine 600 that is executed in a controller in an embodiment of the directional speed sensing system 100 described hereinabove. Table 2 is provided as a key wherein the numerically labeled blocks and the corresponding functions are set forth as follows, corresponding to the duty cycle validation routine 600.

TABLE 2

| BLOCK | BLOCK CONTENTS |
|---|---|
| 600 | Duty cycle validation routine |
| 602 | Increment 4x pulse timing T[k] |
| 604 | Nrpm<LowSpdthrshld and 4xCntDelta = 0 |
| 610 | 4xCntDelta = 0 |
| 612 | dT[k − 1] = dT[k]<br>dT[k] = 0 |
| 620 | Calculate duty ratio (DR)<br>DR = dT[k]/dT[k − 1]<br>Reset dT[k − 1] = dT[k]<br>Reset dT[k] = 0 |
| 622 | DR>1? |
| 624 | DR = 1/DR |
| 626 | DR<(Threshold)? |
| 628 | Invalid duty cycle |
| 630 | Valid duty cycle |
| 640 | End |

The duty cycle validation routine 600 is a scheduled task that executes periodically during ongoing operation, e.g., once every 100 microseconds or once every 500 microseconds, and relates to the timing of the 4× counter pulses. Under a condition of steady state speed, the edges of the 4× counter pulses are equally spaced, with a time delta determined based on the rotational speed. Monitored signals illustrating the concepts related to the duty cycle validation routine 600 are described with reference to FIG. 7, and include signals A 710 and B 720 and 4× counter 730. An invalid phase relationship can be detected employing the elapsed time between received 4× pulses that are monitored by the 4× counter 730. A ratio of successive 4× count edge time deltas is taken and compared to a threshold. If the ratio is less than the threshold, zero speed is indicated, and thus set as the output speed value. The threshold used for comparison must account for the maximum acceleration rate of the rotatable member 15, which will cause the 4× count delta to change as the speed increases or decreases.

The duty cycle validation routine 600 determines a 4× count time ratio to validate a duty cycle of the 4× counter, thus indicating whether a phase relationship between the waveforms associated with signals A and B is valid. In operation, the 4×count timing T[k] is incremented, limited to a 60 second period (602). The 4× count timing T[k] is an elapsed period of time between successive current pulses associated with rising or falling edges detected in either of signal A or signal B. The rotational speed Nrpm is compared to a low speed threshold (LowSpdThrshld), which can be in the order of magnitude of 100 RPM and the value of the 4× counter delta, i.e., 4×Cnt[k]-4×Cnt[k-1], where k is the execution cycle, is evaluated (604). When the rotational speed Nrpm is greater than the low speed threshold (LowSpdThrshld) (604)(0), the magnitude of the 4× counter delta is evaluated (610). When the 4× counter delta is equal to zero (610)(0), this iteration ends with no further action (640). When the 4× counter delta is not equal to zero (610)(1), the 4× count timing is shifted as follows: dT[k-1]=dT[k], and dT[k]=0 (612), and this iteration ends (640).

When the rotational speed Nrpm is less than the low speed threshold (LowSpdThrshld) and the 4× counter delta (4×CntDelta) is equal to zero (604)(1), a duty ratio DR is calculated as follows based upon the 4× count timing increments (620):

$$DR=dT[k]/dT[k-1] \quad [1]$$

Eq. 1 shows calculation of a specific index for the duty cycle in the form of duty ratio DR. Other duty cycles indices can be developed and calculated and associated thresholds may be determined within the scope of this disclosure. The terms "duty cycle" and "duty ratio" are used interchangeably throughout this disclosure.

The related terms are then reset as follows for the next iteration of the duty cycle validation routine 600:

$$dT[k-1]=dT[k]$$

$$dT[k]=0$$

As such, the duty ratio DR is determined by monitoring a first elapsed period of time between a first set of successive current pulses associated with either rising or falling edges detected in either of the signal outputs from the first and second rotational speed sensing devices, i.e., signal A and signal B, and monitoring a second elapsed period of time between a second set of successive current pulses associated with the corresponding rising or falling edge detected in either of the signal outputs from the first and second rotational speed sensing devices, and then calculating a duty ratio between the first and second elapsed periods of time.

Under expected operating conditions, the duty ratio DR is equal to 1.0 in an embodiment that includes signal B 720 shifted by 90° of tooth rotation in relation to the signal A 710. The duty ratio DR is evaluated to determine if it is greater than 1.0 (622), and if so, a reciprocal of the duty ratio DR is calculated (624). The resulting DR is compared to a duty ratio threshold (626). The duty ratio threshold preferably accounts for and is adjusted based upon a maximum acceleration rate of the rotating member, which contributes to the 4× count delta to change as the speed increases or decreases. The duty ratio threshold may also include unexpected errors associated with changes in speed of the rotatable member 15, and is in the order of magnitude of 0.20 in one embodiment. When the duty ratio DR is less than the duty ratio threshold (626)(1), the routine indicates that the duty cycle is invalid (628), and this iteration end (640). When the duty ratio DR is greater than the duty ratio threshold (626)(0), the routine indicates that the duty cycle is valid (630), and this iteration end (640).

Figure 7:
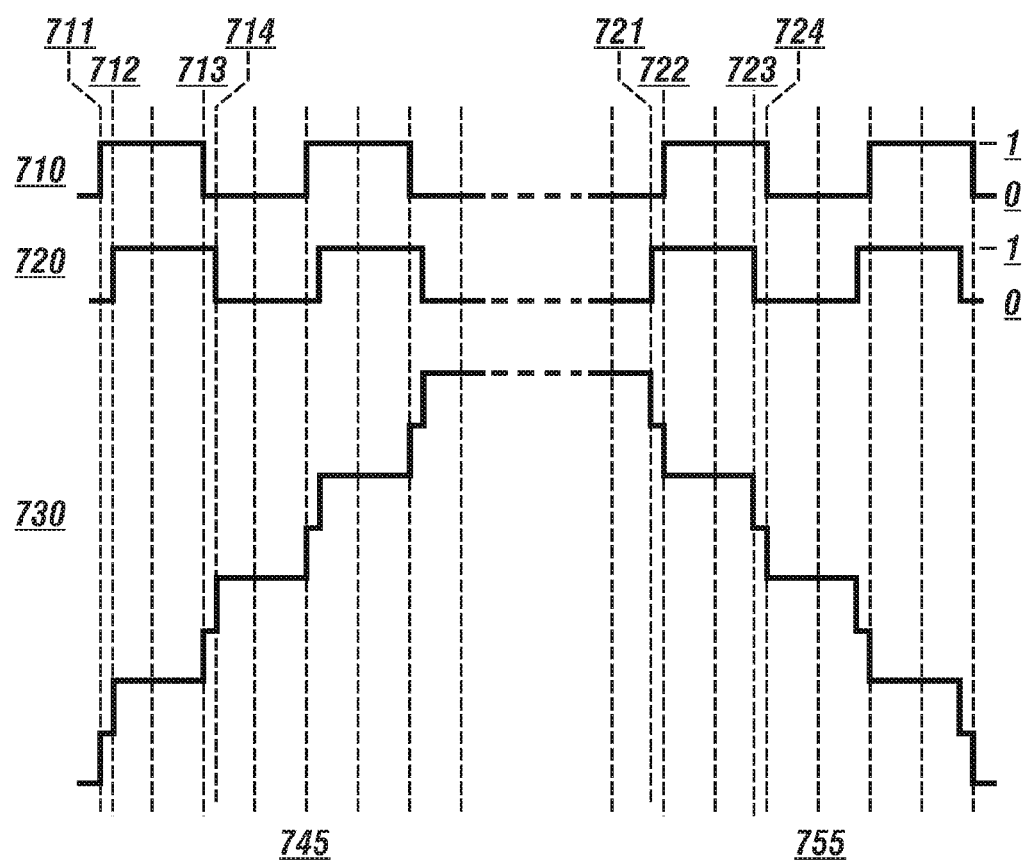
FIG. 7 graphically shows signal outputs from first and second sensing devices of an embodiment of the directional speed sensing system described with reference to FIG. 1 and corresponding a 4× counter under operating conditions when a phase relationship between the signal outputs from first and second sensing devices is distorted, in accordance with the disclosure.

FIG. 7 graphically shows signals A 710, B 720 and 4× counter 730, which are analogous to signals A 310, B 320, and 4× counter 330, respectively, shown with reference to FIG. 3. Period 745 includes a nominally forward direction of rotation, and period 755 includes a nominally reverse direction of rotation. Current pulses associated with rising or falling edges detected in either of signal A 710 or signal B 720 occur at timepoints 711, 712, 713 and 714 for a nominally forward direction of rotation during period 745, and are employed to determine elapsed period of times T[k] associated with 4× count timing. In a similar manner, current pulses associated with rising or falling edges detected in either of signal A 710 or signal B 720 occur at timepoints 721, 722, 723 and 724 for a nominally reverse direction of rotation during period 755, and are employed to determine the elapsed period of times T[k] associated with 4× count timing described with reference to step 602 of FIG. 6.

Signals A 710, B 720 and 4× counter 730 are captured under operating conditions that lead to a distorted phase relationship of the waveforms. This is indicated when a time delta between subsequent 4× pulses is not constant. This is shown based upon a relationship between a first elapsed time between timepoints 711 and 712 and a second elapsed time between timepoints 712 and 713 in the nominally forward direction of rotation. This is also shown based upon a relationship between a first elapsed time between timepoints 721 and 722 and a second elapsed time between timepoints 722 and 723 in the nominally reverse direction of rotation. Using the elapsed time between received 4× pulses, an invalid phase relationship can be detected by calculating a ratio of 4× count edge time deltas and comparing them to a threshold. When the ratio is less than the threshold, zero speed is indicated and set as the output speed value. The threshold accounts for a maximum acceleration rate of the rotating member, which will cause the 4× count delta to change as the speed increases or decreases during a single measurement cycle.

The foregoing control routines have demonstrated an ability to detect zero speed that is associated with a locked rotatable member 15. When a small speed value was calculated, it lasted only one execution cycle, and its magnitude was too small to cause any issues. Furthermore the control routines have no effect on normal speed calculations once the rotatable member 15 was able to accelerate from zero speed. The control routines allow detection of a non-rotating rotatable member 15 when pulse waveforms from one of the rotational monitoring sensors are corrupted due to vibration and/or lash during zero speed operation, while also allowing normal speed and position calculation as the rotatable member 15 begins to accelerate from zero speed.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for evaluating signal outputs from first and second rotational sensing devices monitoring a multi-tooth target wheel rotationally coupled to a rotatable member, the method comprising:

monitoring, by a controller, signal outputs from the first and second rotational speed sensing devices;

incrementing a first counter when the first rotational speed sensing device detects a falling edge of one of the teeth of the target wheel;

incrementing a second counter when the second rotational speed sensing device detects a falling edge of one of the teeth of the target wheel;

incrementing a third counter when either of the first and second rotational speed sensing devices detects either of a rising edge and a falling edge of one of the teeth of the target wheel;

determining a direction of rotation of the rotatable member based upon the third counter;

determining a rotational speed of the rotatable member based upon one of the first and second counters; and indicating that the rotatable member is at zero speed when the rotational speed is less than a threshold speed and the direction of rotation of the rotatable member changes between a positive direction and a negative direction.

2. The method of claim 1, further comprising:

determining a duty ratio;

determining whether the duty ratio is invalid; and indicating that the rotatable member is at a zero speed when the rotational speed is less than a threshold speed and the duty ratio is determined invalid.

3. The method of claim 2, wherein determining whether the duty ratio is invalid comprises:

monitoring a first elapsed period of time between a first set of successive current pulses associated with rising or falling edges detected in either of the signal outputs from the first and second rotational speed sensing devices;

monitoring a second elapsed period of time between a second set of successive current pulses associated with rising or falling edges detected in either of the signal outputs from the first and second rotational speed sensing devices;

calculating a duty ratio between the first and second elapsed periods of time; and comparing the duty ratio to a duty ratio threshold.

4. The method of claim 3, further comprising determining the duty ratio threshold based upon an ideal duty ratio of 1.0 when the second rotational sensing device is offset by 90° of a single tooth cycle in relation to the first sensing device, the ideal duty ratio of 1.0 adjusted based upon a maximum acceleration rate of the rotating member.

5. The method of claim 1, wherein indicating that the rotatable member is at a zero speed when the rotational speed is less than a threshold speed and the direction of rotation of the rotatable member changes between a positive direction and a negative direction comprises indicating that the rotatable member is at a zero speed when the direction of rotation of the rotatable member changes between the positive direction and the negative direction during successive determinations of the direction of rotation of the rotatable member based upon the third counter.

6. The method of claim 1, wherein monitoring signal outputs from the first and second rotational speed sensing devices comprises monitoring discrete signal outputs from the first and second rotational speed sensing devices.

7. A method for evaluating signal outputs from first and second rotational sensing devices monitoring a multi-tooth target wheel rotationally coupled to a rotatable member, the second rotational sensing device offset by 90° of a single tooth cycle in relation to the first sensing device, the method comprising:

monitoring, by a controller, signal outputs from the first and second rotational speed sensing devices;

incrementing a first counter when the first rotational speed sensing device detects a falling edge of one of the teeth of the target wheel;

incrementing a second counter when the second rotational speed sensing device detects a falling edge of one of the teeth of the target wheel;

incrementing a third counter when either of the first and second rotational speed sensing devices detects either of a rising edge and a falling edge of one of the teeth of the target wheel;

determining a rotational speed of the rotatable member based upon one of the first and second counters;

determining a duty ratio;

determining whether the duty ratio is invalid; and indicating the rotatable member is at a zero speed when the rotational speed is less than a threshold speed and the duty ratio is invalid.

8. The method of claim 7, wherein determining the duty ratio comprises:

monitoring a first elapsed period of time between a first set of successive current pulses associated with rising or falling edges detected in one of the signal outputs from the first and second rotational speed sensing devices;

monitoring a second elapsed period of time between a second set of successive current pulses associated with corresponding rising or falling edges detected in the one of the signal outputs from the first and second rotational speed sensing devices; and calculating a ratio between the first and second elapsed periods of time.

9. The method of claim 7, wherein determining whether the duty ratio is invalid comprises comparing the duty ratio to a duty ratio threshold, the duty ratio threshold determined based upon an ideal duty ratio of 1.0 when the second rotational sensing device is offset by 90° of a single tooth cycle in relation to the first sensing device, the ideal duty ratio of 1.0 adjusted based upon a maximum acceleration rate of the rotating member.

10. The method of claim 7, further comprising determining a direction of rotation of the rotatable member based upon the third counter.

11. The method of claim 7, further comprising:

determining a rotational speed of the rotatable member based upon one of the first and second counters; and indicating that the rotatable member is at zero speed when the rotational speed is less than a threshold speed and the direction of rotation of the rotatable member changes between a positive direction and a negative direction.

12. The method of claim 7, wherein indicating the rotatable member is at a zero speed when the rotational speed is less than a threshold speed and the direction of rotation of the rotatable member changes between a positive direction and a negative direction comprises indicating the rotatable member is at a zero speed when the direction of rotation of the rotatable member changes between the positive direction and the negative direction during successive determinations of the direction of rotation of the rotatable member based upon the third counter.

13. The method of claim 7, wherein monitoring signal outputs from the first and second rotational speed sensing devices comprises monitoring discrete signal outputs from the first and second rotational speed sensing devices.

14. A method for evaluating signal outputs from first and second rotational sensing devices monitoring a multi-tooth target wheel rotationally coupled to a rotatable member, the second rotational sensing device offset by 90° of a single tooth cycle in relation to the first sensing device, the method comprising:

monitoring, by a controller, signal outputs from the first and second rotational speed sensing devices;

incrementing a first counter when the first rotational speed sensing device detects a falling edge of one of the teeth of the target wheel;

determining a rotational speed of the rotatable member based upon the first counter;

incrementing a third counter when either of the first and second rotational speed sensing devices detects either of a rising edge and a falling edge of one of the teeth of the target wheel;

determining a duty ratio based upon the signal outputs from the first and second rotational speed sensing devices, including:

monitoring a first elapsed period of time between a first set of successive current pulses associated with rising or falling edges detected in one of the signal outputs from the first and second rotational speed sensing devices, monitoring a second elapsed period of time between a second set of successive current pulses associated with corresponding rising or falling edges detected in the one of the signal outputs from the first and second rotational speed sensing devices, and calculating a ratio between the first and second elapsed periods of time;

determining whether the duty ratio is valid or invalid; and indicating that the rotatable member is at a zero speed when the rotational speed is less than a threshold speed and the duty ratio is determined invalid.

15. The method of claim 14, wherein determining whether the duty ratio is valid or invalid includes comparing the duty ratio to a duty ratio threshold, the duty ratio threshold determined based upon an ideal duty ratio of 1.0 when the second rotational sensing device is offset by 90° of a single tooth cycle in relation to the first sensing device, the ideal duty ratio of 1.0 adjusted based upon a maximum acceleration rate of the rotating member.

\* \* \* \* \*